(12) United States Patent
Fukushima et al.

(10) Patent No.: US 6,198,604 B1
(45) Date of Patent: Mar. 6, 2001

(54) METHOD OF AND APPARATUS FOR UNLOCKING AN ACTUATOR IN A DISK STORAGE APPARATUS

(75) Inventors: Yukio Fukushima, Sagamihara; Junichi Kimura, Fujisawa, both of (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/268,861

(22) Filed: Jun. 29, 1994

Related U.S. Application Data

(63) Continuation of application No. 07/962,444, filed on Oct. 16, 1992, now abandoned.

(30) Foreign Application Priority Data

Oct. 16, 1991 (JP) .................................................. 3-294882

(51) Int. Cl.[7] .............................. G11B 5/54; G11B 21/22
(52) U.S. Cl. ................................ 360/256.3; 360/256.2; 360/75
(58) Field of Search ...................... 360/105, 75; 369/215, 369/221, 250

(56) References Cited

U.S. PATENT DOCUMENTS

| 4,237,501 | 12/1980 | Barmache et al. | |
|---|---|---|---|
| 4,786,994 | * 11/1988 | Carteau et al. | 360/75 |
| 4,807,062 | * 2/1989 | Onodera | 360/75 |
| 4,985,793 | * 1/1991 | Anderson | 360/105 |
| 5,025,335 | * 6/1991 | Stefansky | 360/105 |
| 5,170,300 | * 12/1992 | Stefansky | 360/105 |
| 5,208,713 | * 5/1993 | Lindsay et al. | 360/105 |

FOREIGN PATENT DOCUMENTS

| 0008670 | 3/1980 | (EP) . |
|---|---|---|
| 9003029 | 3/1990 | (WO) . |

OTHER PUBLICATIONS

Patent Abstracts of Japan, vol. 7, No. 70 (P–185), Mar. 23, 1982, JP–A–57 212 668 (Richoh), "Floppy Disk Driving Device".

Patent Abstract of Japan, vol. 7, No. 75 (P–187), Mar. 29, 1983, JP–A–58 006 560 (Fujitsu), "Magnetic Disk Device".

* cited by examiner

*Primary Examiner*—George J. Letscher
(74) *Attorney, Agent, or Firm*—Richard E. Billion; Roy W. Truelson; Owen J. Gamon

(57) ABSTRACT

In the present invention, a disk storage apparatus 1 is previously given acceleration current Ia and acceleration time Ta which is supplied to an actuator 6 for releasing the actuator from a permanent magnet 12, and deceleration current Id and deceleration time Td which is supplied to the actuator 6 for stopping the released actuator 6 at a data zone on a disk. When power-on operation, the actuator is driven according to the previously stored acceleration current, acceleration time, deceleration current, and deceleration time to be released from the permanent magnet lock.

6 Claims, 4 Drawing Sheets

METHOD OF AND APPARATUS FOR UNLOCKING AN ACTUATOR IN A DISK STORAGE APPARATUS

This is a continuation of application Ser. No. 07/962,444 filed on Oct. 16, 1992, now abandoned.

BACKGROUND OF THE INVENTION

1. Field of the Invention

This invention relates to an actuator unlocking apparatus and a method of releasing an actuator from magnetic attraction during power-on operation, in a disk storage apparatus. An actuator for moving a transducer head on a disk storage medium is locked by a magnetic locking apparatus to prevent the actuator and the disk storage medium from being damaged by unintentional movement of them when the disk storage apparatus is not powered. This invention relates to an improved method of and apparatus for releasing an actuator from magnetic locking apparatus at power-on operation.

2. Description of the Prior Art

In a disk storage apparatus, it is necessary to prevent an actuator (a voice coil motor (VCM), etc.) for moving a transducer head on a recording medium from moving due to external force and from damaging data on a recording surface and the actuator itself, by locking the actuator when the disk storage apparatus is not powered. In a small disk storage apparatus, the magnetic attraction of a permanent magnet is used to lock the actuator.

In this prior art configuration, owing to the magnetic attraction of -the permanent magnet, power is not consumed except when locking is released during a power-on operation. Further, in this configuration, the dimensions of the disk storage apparatus can be reduced because there is mechanically no movable part. Since the power of the actuator is used to unlock, a dedicated electric circuit for unlocking is not needed. Still further, in the configuration, component parts are merely the permanent magnet and its attaching members. Therefore, the configuration is generally adopted because of the advantage that the number of parts is small and a cost can be reduced. The present invention relates to an unlocking apparatus and method of a disk storage apparatus which unlocks an actuator from the permanent magnet.

In prior art, in order to release the actuator from the permanent magnet, positional information (servo information) written between a zone where the actuator is locked (parking zone) and a zone where data is recorded (data zone) on a disk recording medium is used and a seek operation is used for releasing. That is, during a releasing operation, a position of the actuator is detected by reading the positional information and the current which is supplied to the actuator is controlled. The actuator is surely released from the permanent magnet and moved to the data zone. The situation in which the releasing cannot be completed because of insufficient movement or in which the actuator collides with a crash stop due to the excess movement of the actuator is avoided by reading positional information on the disk.

However, the servo information written between the parking zone and the data zone on the disk medium may disappear due to the friction between the transducer head and the disk medium if the actuator is locked and released many times, because the parking zone is a zone on which the transducer head attached to the actuator slides when the rotational rate of the disk is below a predetermined value (contact start and stop). Once the servo information is lost, releasing cannot be completed because the positional information for the releasing cannot be obtained any more. In the prior art, there is therefore a problem in terms of reliability.

SUMMARY OF THE INVENTION

Accordingly, it is an object of the present invention to solve a problem of a conventional unlocking apparatus of a disk storage apparatus, in which positional information is lost by the contacting start and stop of a transducer head and therefore it becomes impossible any more to release the locking of the actuator locked by a magnet.

According to the present invention, a disk storage apparatus is previously given acceleration current and acceleration time which should be supplied to an actuator so as to release the actuator from the permanent magnet against the attraction of the magnetic force, and deceleration current and deceleration time which should be supplied to the actuator so as to stop the actuator at a data zone on the disk. When the actuator is unlocked, the actuator is driven according to the previously stored acceleration current, acceleration time, deceleration current, and deceleration time. Therefore, according to the present invention, it is unnecessary to write positional information of the actuator between a parking zone and the data zone on a disk to release the actuator. In consequence, an unlocking apparatus or method according to the present invention can gain in reliability. The present invention is hereinafter described in accordance with a preferred embodiment in conjunction with drawings.

DETAILED DESCRIPTION OF THE PREFERRED EMBODIMENTS

Figure 1:
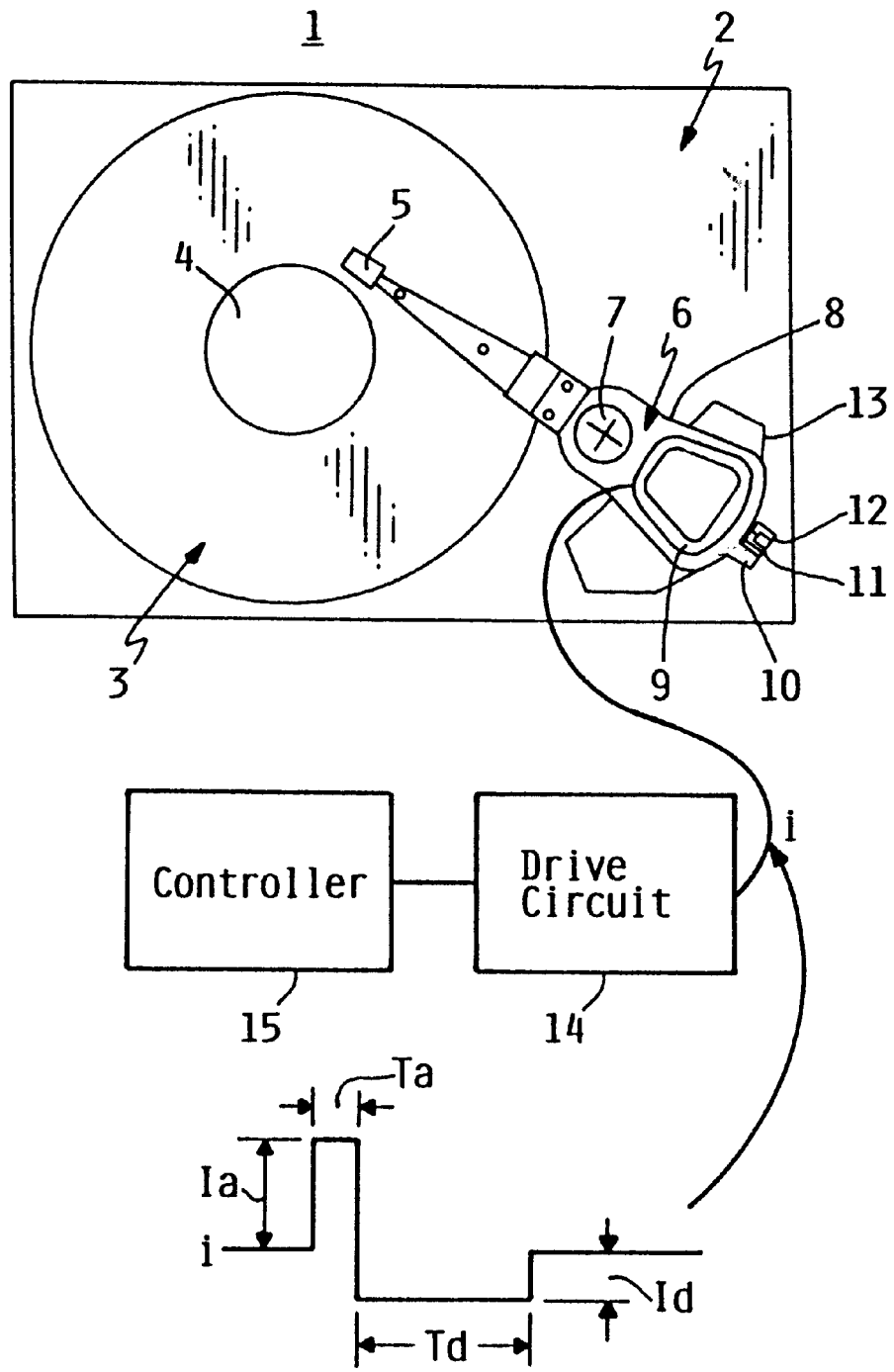
FIG. 1 is a top view showing a magnetic disk storage apparatus to which an embodiment of an unlocking apparatus is applied according to the present invention.

FIG. 1 shows an actuator unlocking apparatus of a disk storage apparatus of a preferred embodiment according to the present invention. A disk storage apparatus 1 has a magnetic disk recording medium 3 enclosed in a housing 2, a spindle motor 4 for rotating the recording medium 3, and an actuator 6 for positioning a transducer head 5 to a desired location on the disk recording medium 3. The actuator 6 is a rotary voice coil motor (VCM) and has an actuator arm 8 pivotally mounted around an axis 7 in the housing 2. Attached to one end of the actuator arm 8 is the transducer head 5, and attached to the other end is a coil 9. The actuator arm 8 is made of aluminum and has a protrusion 10 provided integrally at the other end to which an iron piece 11 is attached. Faced with the iron piece 11 and fixed to the housing 2 is a permanent magnet 12. Within the limits of movement of the coil 9 of the actuator 6, a permanent magnet 13 of the VCM is attached to the housing 2 and rotates the actuator arm 8 around the axis 7 of rotation through interaction with the coil 9. Supplied to the coil 9 from a drive circuit 14 is drive current i. The drive current i from the drive circuit 14 is controlled by a controller 15.

The actuator arm 8 is moved to a parking zone provided in the inner circumference of the magnetic disk 3 when a speed of the magnetic disk 3 decreases while the disk storage apparatus 1 is powered-off. Then, the iron piece 11 is attracted to the permanent magnet 12 by magnetic force, and thereby the actuator arm 8 at the inner circumference of the recording medium 3 is locked. The transducer head 5 lands at the parking zone and stops. In this state, even if external force is applied, the actuator arm 8 does not move because it is locked by magnetic force, and data at a data zone on the recording medium 3 and the actuator 6 itself are protected from the unexpected movement of the transducer head 5 and the actuator arm 8.

It is necessary to release the actuator arm 8 from the permanent magnet 12 during a power-on operation of the disk storage apparatus 1. For this purpose, acceleration drive current values Ia for acceleration drive time Ta which is necessary for overcoming the attraction of the magnet 12 for releasing is supplied to the coil 9 so as to drive the actuator arm 8 toward the outer circumference of the recording medium 3. Ia and Ta are previously stored in the controller 15. Further, deceleration drive current Id for deceleration drive time Td which is necessary for stopping the actuator arm 8 released from the magnet 12 at a certain position m in a data zone (for example, a midpoint of the data zone) is supplied so as to decelerate the actuator arm. Id and Td are also previously stored in the controller 15.

Figure 2:
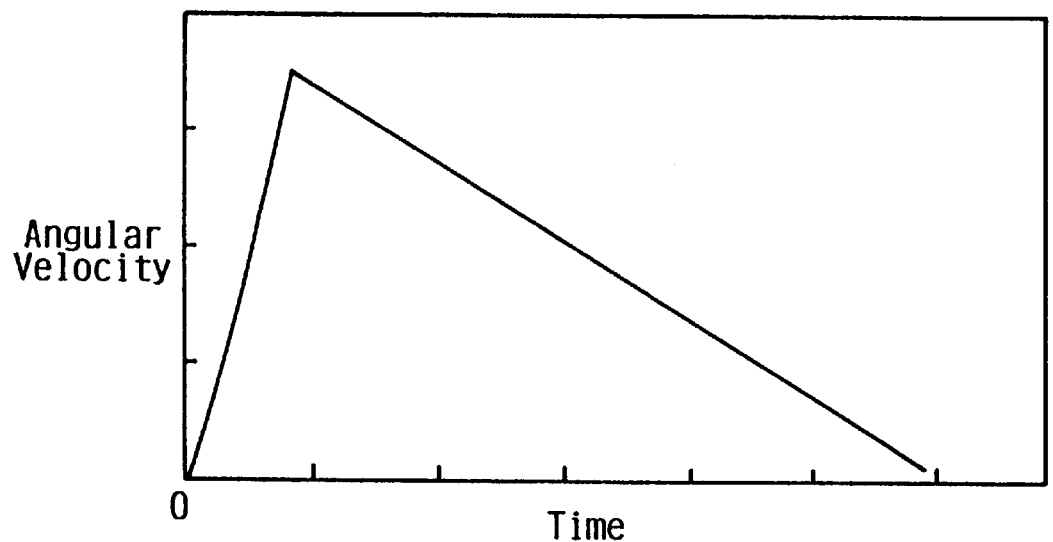
FIG. 2 is a figure showing the movement of the unlocking apparatus of the embodiment, in which an ordinate denotes angular velocity of an actuator arm and an abscissa denotes time.
Figure 3:
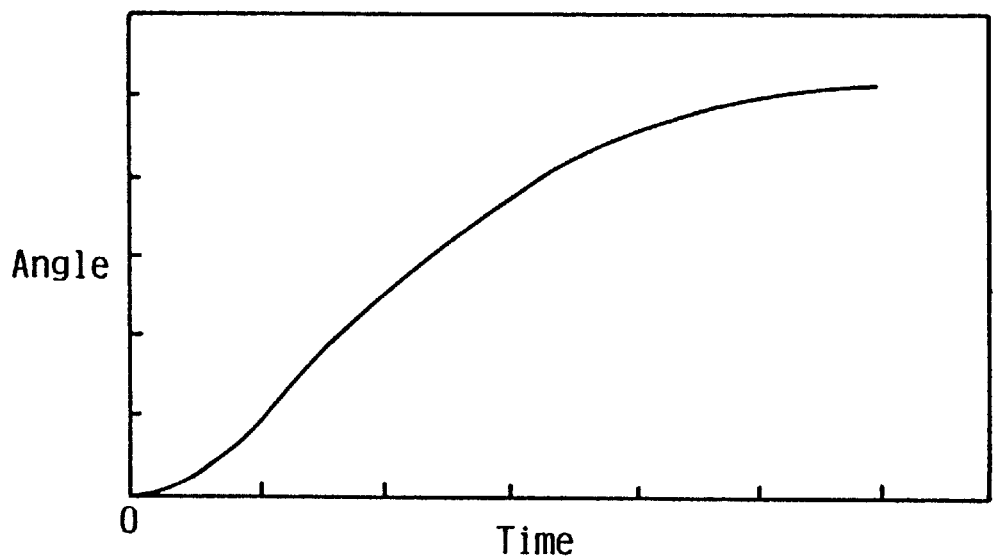
FIG. 3 is a figure showing the movement of the unlocking apparatus of the embodiment, in which an ordinate denotes angles of the actuator arm and an abscissa denotes time.

As shown in from FIG. 1 to FIG. 3, when the drive currents Ia and Id stored previously in the controller 15 are sequentially supplied to the coil 9 of the actuator 6 for the time of Ta and Td respectively through the drive circuit 14, the actuator arm 8 is released from the magnet 12, moved to the data zone, and stopped at the midpoint m of the data zone. Besides, it will be appreciated that if the transducer head 5 enters the data zone in the deceleration time Td the actuator arm 8 may be stopped at a predetermined position by reading positional (servo) information on the data zone.

The acceleration drive current Ia, acceleration time Ta, deceleration drive current Id, and deceleration time Td can be obtained by solving an equation of motion of the actuator arm 8.

Equation of Motion:

$$M*a = K*i - Fm - Ff - Fp$$

where,

M is rotational moment of inertia of the actuator arm 8,
a is angular acceleration of the actuator arm 8,
K is a torque constant of a VCM, i is drive current of a VCM,
Fm is attraction torque of the permanent magnet 12,
Ff is torque of a flexible cable which supplies the coil 9 with current,
Fp is frictional force of the axis 7 of rotation.

Figure 4:
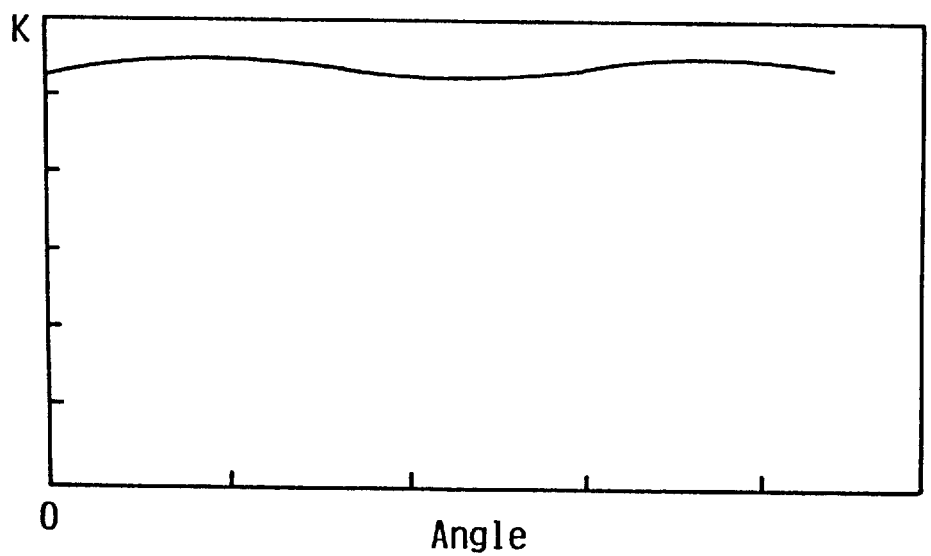
FIG. 4 is a figure in which an ordinate denotes torque constants K of a voice coil motor, which is an actuator of the embodiment, and an abscissa denotes rotational angles of the actuator arm from a locked position of the actuator arm.
Figure 5:
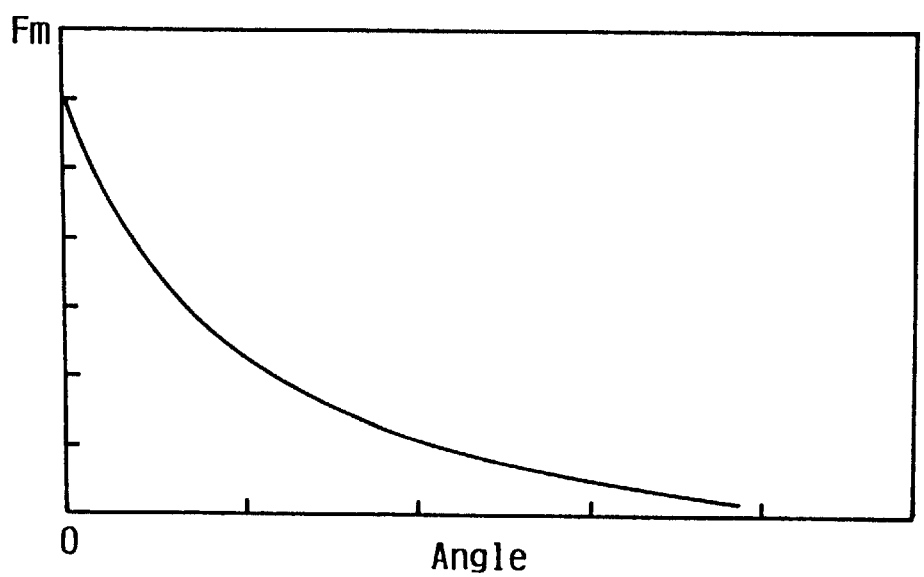
FIG. 5 is a figure in which an ordinate denotes magnetic force Fm of a permanent magnet of the embodiment and an abscissa denotes rotational angles of the actuator arm from a locked position of the actuator arm.
Figure 6:
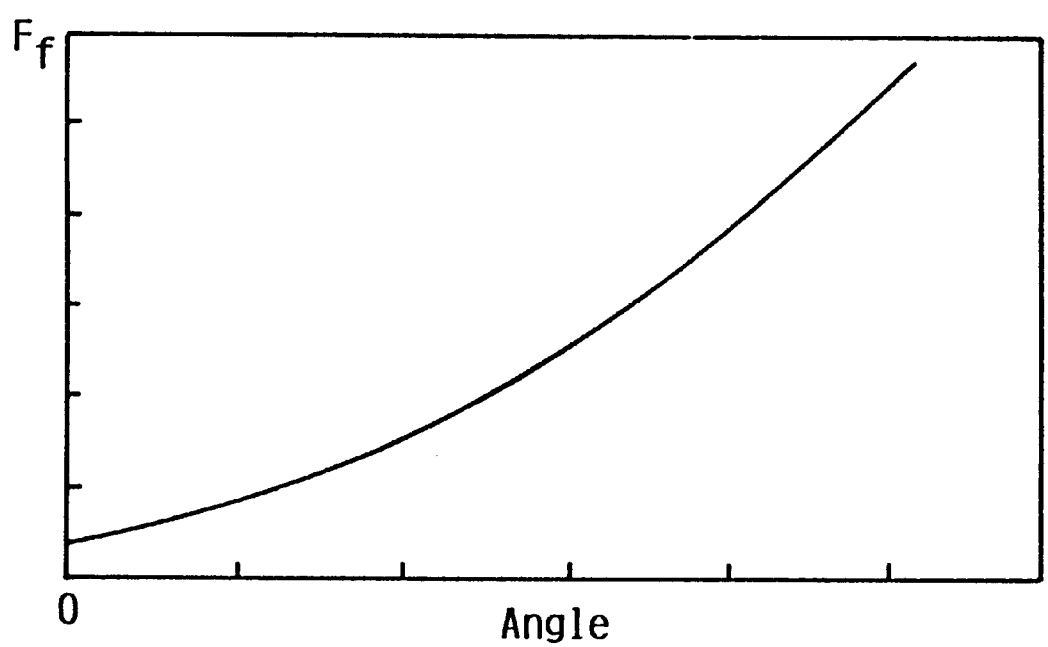
FIG. 6 is a figure in which an ordinate denotes force Ff exerted on the actuator arm by a flexible cable attached to the actuator arm of the embodiment, and an abscissa denotes rotational angles of the actuator arm from a locked position of the actuator arm.

Since K, Fm, and F:E depend on a position (angle) of the actuator arm 8 as shown in FIG. 4, FIG. 5, and FIG. 6 respectively, this equation of motion can be solved by means of well-known approximation calculation by a computer.

That is, K shown in FIG. 4 is approximated to a polynomial of higher degree as follows:

$$K = a_1*x + a_2*x^2 + \ldots + a_{n1}*x^{n1}$$

Fm shown in FIG. 5 is approximated to a polynomial of higher degree as follows:

$$Fm = b_1*x + b_2*x^2 + \ldots + b_{n2}*x^{n2}$$

or $$Fm = 1/(x+b_1) + b_2$$

Ff shown in FIG. 6 is approximated to a polynomial of higher degree as follows:

$$Ff = c_1*x + c_2*x^2 + \ldots + c_{n3}*x^{n3}$$

Accordingly, the equation of motion can be expressed as follows:

$$M*d^2x/dt^2 = (a_1*x + a_2*x^2 + \ldots + a_{n1}x^{n1})*i - (b_1*x + b_2*x^2 + \ldots + b_{n2}*x^{n2}) - (c_1*x + c_2*x^2 + \ldots + c_{n3}*x^{n3}) - Fp$$

where x is a rotational angle of the actuator arm 8 and angular acceleration a is $d^2x/dt^2$. This differential equation can be approximately solved by a computer.

From the equation, the acceleration drive current Ia, which is necessary for the actuator arm 8 to move at the appropriate angular acceleration a, can be obtained, and the actuator arm 8 is accelerated for the time Ta until it reaches an appropriate velocity and position as shown in FIG. 2. Then, angular acceleration a for deceleration, which is necessary for the actuator arm 8 to stop at a predetermined position m as shown in FIG. 3, can be obtained, and the deceleration drive current Id and deceleration time Td, which are necessary for the angular acceleration a for deceleration, are obtained. Values Ia, Id, Ta, and Td thus obtained are stored in the disk storage apparatus 1, and when the actuator arm 8 is unlocked during a power-on operation, the controller 15 and the drive circuit 14 are controlled based on the stored values Ia, Id, Ta, and Td.

It will be appreciated that the present invention may be applied not only to a rotary actuator, but also to a linear actuator. Further, it will be appreciated also that the present invention may be applied to any actuator other than a VCM, for example, a step motor. Still further, it will be appreciated also that the present invention may be applied not only to a magnetic disk storage apparatus, but also to an optical storage apparatus or a magneto-optical storage apparatus.

As described above, according to the present invention, since an actuator is released from a permanent magnet lock by previously-stored acceleration drive current and acceleration time, and deceleration drive current and deceleration time, the actuator can be unlocked without, differently from a prior art, any positional information on a parking zone of a recording medium, where there is a possibility of disappearance of the information due to abrasion by the slide of a transducer head. Therefore, according to the present invention, it becomes possible to provide a more reliable unlocking apparatus as compared with the prior art.

What is claimed is:

1. A disk storage apparatus comprising:

a housing;

a disk storage medium rotatably mounted to said housing;

an actuator including a transducer head at one end for communicating information with the storage medium;

a coil attached to the actuator for controlling the movement of the actuator and the transducer by varying the current to the coil;

a magnetic locking apparatus for locking the actuator, said magnetic locking apparatus comprising a permanent magnet and a member attracted by said permanent magnet, wherein one of said permanent magnet and said attracted member is attached to said actuator, and the other of said permanent magnet and said attracted member is attached to said housing, said permanent magnet and attracted member being mounted such that, when said actuator is in a locked position, said attracted member is held by said permanent magnet; and an actuator unlocking apparatus including:

means for supplying a first predetermined drive current to said coil generating a force against said magnetic force of said magnetic locking apparatus to unlock said actuator from said magnetic locking apparatus; and means for supplying a second predetermined drive current to said coil, said second current in the opposite direction to said first predetermined drive current, wherein said second predetermined drive current is selected to stop motion caused by said first predetermined drive current and stop said actuator within the data zone of said disk storage medium.

2. A disk storage apparatus comprising:

a housing;

a disk storage medium rotatably mounted to said housing;

an actuator including a transducer head at one end for communicating information with the storage medium;

a coil attached to the actuator for controlling the movement of the actuator and the transducer by varying the current to the coil;

a magnetic locking apparatus for locking the actuator, said magnetic locking apparatus comprising a permanent magnet and a member attracted by said permanent magnet, wherein one of said permanent magnet and said attracted member is attached to said actuator, and the other of said permanent magnet and said attracted member is attached to said housing, said permanent magnet and attracted member being mounted such that, when said actuator is in a locked position, said attracted members held by said permanent magnet; and an actuator unlocking apparatus including:

means for supplying a first predetermined drive current to said coil for a first predetermined time to generate a force against said magnetic force of said magnetic locking apparatus to unlock said actuator from said magnetic locking apparatus; and means for supplying a second predetermined drive current to said coil, said second current in the opposite direction to said first predetermined drive current and for a second predetermined time after said first predetermined time said second predetermined drive current stopping the motion of the actuator caused by said first predetermined drive current.

3. The disk storage apparatus of claim 2 wherein said second predetermined drive current is selected to stop said actuator in the data zone of said disk storage medium.

4. A method of releasing an actuator in a disk drive from a magnetic actuator lock during the power-on operation, the actuator including a coil attached to the actuator, the drive including an apparatus for varying the current to the coil to produce a force on the actuator, said disk drive including at least one disk having a data zone, said method comprising the steps of:

supplying a first drive current of a predetermined amperage and duration to the c oil of the actuator to generate a force to release the actuator from the magnetic actuator lock; and supplying a second drive current of a predetermined amperage and duration to the coil of the actuator, the second drive current in a direction opposite the first drive current and having a value and duration to stop the motion caused by said first predetermined drive current.

5. A method of releasing an actuator in a disk drive from a magnetic actuator lock of claim 4 wherein the actuator is stopped at the data zone after the release of the actuator from the magnetic locking apparatus.

6. A method of releasing an actuator in a disk drive from a magnetic actuator lock of claim 4 wherein the predetermined amperage of said first drive current and said second drive current is previously selected on the basis of the magnetic locking apparatus and the inertial mass of the actuator.

* * * * *